US011306746B2

(12) United States Patent
Fukuda et al.

(10) Patent No.: US 11,306,746 B2
(45) Date of Patent: Apr. 19, 2022

(54) HYDRAULIC SYSTEM FOR WORKING MACHINE

(71) Applicant: KUBOTA CORPORATION, Osaka (JP)

(72) Inventors: Yuji Fukuda, Osaka (JP); Keigo Honda, Osaka (JP); Ryosuke Kinugawa, Osaka (JP); Ryuki Nishimoto, Osaka (JP); Yuji Yamashita, Osaka (JP); Daisuke Sakurai, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 4 days.

(21) Appl. No.: 16/987,910

(22) Filed: Aug. 7, 2020

(65) Prior Publication Data
US 2020/0362884 A1 Nov. 19, 2020

Related U.S. Application Data

(62) Division of application No. 15/854,134, filed on Dec. 26, 2017, now Pat. No. 10,774,852.

(30) Foreign Application Priority Data

Dec. 28, 2016 (JP) .............................. JP2016-255460

(51) Int. Cl.
*E02F 9/22* (2006.01)
*F15B 11/08* (2006.01)
(Continued)

(52) U.S. Cl.
CPC .......... *F15B 13/021* (2013.01); *E02F 9/2203* (2013.01); *E02F 9/2207* (2013.01);
(Continued)

(58) Field of Classification Search
CPC .... F15B 1/021; F15B 13/043; F15B 13/0435; F15B 2211/851
See application file for complete search history.

(56) References Cited

U.S. PATENT DOCUMENTS 2,800,143 A 7/1957 Keller et al.
4,066,103 A 1/1978 Tandrup
(Continued)

FOREIGN PATENT DOCUMENTS

JP 62-110006 A 5/1987
JP 03-286047 A 12/1991
(Continued)

*Primary Examiner* — Kenneth Bomberg
*Assistant Examiner* — Matthew Wiblin
(74) *Attorney, Agent, or Firm* — Greenblum & Bernstein, P.L.C.

(57) ABSTRACT

A hydraulic system for a working machine includes a hydraulic actuator having a first fluid chamber and a second fluid chamber, an accumulator, an outputting fluid tube to output an operation fluid, and a switching valve to be switched between a first position and a second position. The first position allows the first fluid chamber and the second fluid chamber to be communicated with the outputting fluid tube and thereby allowing a floating operation. The second position allows the first fluid chamber and the accumulator to be communicated with each other, allows the second fluid chamber and the outputting fluid tube to be communicated with each other, and thereby allows an anti-vibration operation.

12 Claims, 11 Drawing Sheets

(51) Int. Cl.
 *F15B 13/02*  (2006.01)
 *F15B 1/26*  (2006.01)
 *F15B 1/02*  (2006.01)
 *F15B 21/0427* (2019.01)
 *F16L 55/04*  (2006.01)
 *E02F 3/34*  (2006.01)

(52) U.S. Cl.
 CPC .......... *E02F 9/2217* (2013.01); *E02F 9/2267* (2013.01); *F15B 1/02* (2013.01); *F15B 1/26* (2013.01); *F15B 11/08* (2013.01); *F15B 21/0427* (2019.01); *E02F 3/3414* (2013.01); *F15B 2201/411* (2013.01); *F15B 2211/30565* (2013.01); *F15B 2211/3127* (2013.01); *F15B 2211/31558* (2013.01); *F15B 2211/329* (2013.01); *F15B 2211/625* (2013.01); *F15B 2211/635* (2013.01); *F15B 2211/66* (2013.01); *F15B 2211/6658* (2013.01); *F15B 2211/8613* (2013.01); *F15B 2211/8616* (2013.01); *F15B 2215/30* (2013.01); *F16L 55/04* (2013.01)

(56) References Cited

U.S. PATENT DOCUMENTS

| | | | |
|---|---|---|---|
| 4,227,440 | A | 10/1980 | Leonard |
| 4,303,003 | A | 12/1981 | Reip |
| 2006/0101815 | A1 | 5/2006 | Kobayashi et al. |
| 2009/0158726 | A1 | 6/2009 | Hanks et al. |
| 2010/0108336 | A1 | 5/2010 | Thomson et al. |
| 2017/0211597 | A1* | 7/2017 | Vigholm ............... E02F 9/2267 |

FOREIGN PATENT DOCUMENTS

| | | | | |
|---|---|---|---|---|
| JP | 04-73058 | U | 6/1992 | |
| JP | 05-8277 | A | 1/1993 | |
| JP | 10-168949 | A | 6/1998 | |
| JP | 2007-186942 | A | 7/2007 | |
| JP | 2010-84784 | A | 4/2010 | |
| WO | WO-2015152775 | A1 * | 10/2015 | ............ F15B 11/028 |

* cited by examiner

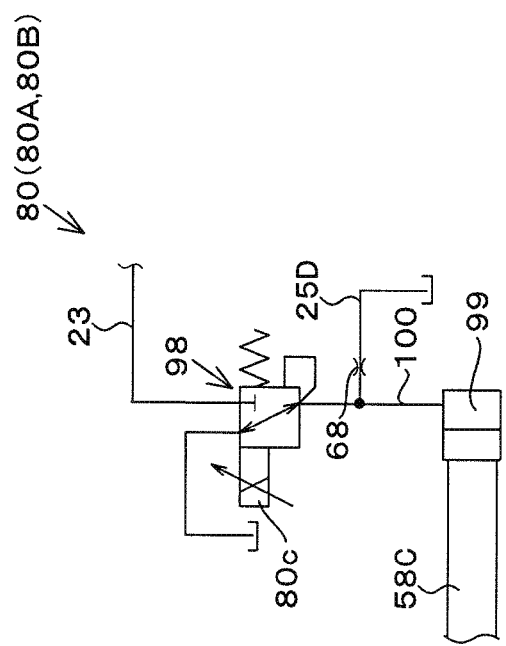

HYDRAULIC SYSTEM FOR WORKING MACHINE

CROSS-REFERENCE TO RELATED APPLICATIONS

The present application is a Divisional of U.S. patent application Ser. No. 15/854,134, filed on Dec. 26, 2017, which claims priority under 35 U.S.C. § 119 to Japanese Patent Application No. 2016-255460, filed on Dec. 28, 2016. The entire disclosures of each of the above-identified applications, including the specification, drawings, and claims of each of these applications, are incorporated by reference herein in their entirety.

BACKGROUND OF THE INVENTION

Field of the Invention

The present invention relates to a hydraulic system for a working machine such as a skid steer loader, a compact track loader, and the like.

Discussion of the Background

Japanese Unexamined Patent Application Publication No. 2007-186942 previously discloses a hydraulic system for a working machine. The working machine disclosed in Japanese Unexamined Patent Application Publication No. 2007-186942 includes a boom, a bucket, a boom cylinder configured to move the boom, a bucket cylinder configured to move the bucket, a first control valve configured to control the stretching and shortening of the boom cylinder, and a second control valve configured to control the stretching and shortening of the bucket cylinder. An operation fluid outputted from a pump is supplied to the first control valve and the second control valve.

The hydraulic system disclosed in Japanese Unexamined Patent Application Publication No. 2007-186942 is a hydraulic system configured to perform a ride control of the working machine. The ride control suppresses fluctuation of the pressure in the boom cylinder and thereby suppresses the traveling vibrations of the working machine, that is, performs an anti-vibration operation of a machine body. In addition, a hydraulic system disclosed in Japanese Unexamined Patent Application Publication No. 2010-84784 outputs an operation fluid of a boom cylinder and thereby performs a floating operation.

SUMMARY OF THE INVENTION

A hydraulic system for a working machine of the present invention, includes a hydraulic actuator having a first fluid chamber and a second fluid chamber, an accumulator, an outputting fluid tube to output an operation fluid, and a switching valve to be switched between a first position and a second position. The first position allows the first fluid chamber and the second fluid chamber to be communicated with the outputting fluid tube and thereby allowing a floating operation. The second position allows the first fluid chamber and the accumulator to be communicated with each other, allows the second fluid chamber and the outputting fluid tube to be communicated with each other, and thereby allows an anti-vibration operation.

Another hydraulic system for a working machine of the present invention, includes a hydraulic actuator having a first fluid chamber and a second fluid chamber, a first accumulator, a second accumulator, an outputting fluid tube to output an operation fluid, and a switching valve to be switched between a first position and a second position. The first position allows the first fluid chamber and the second fluid chamber to be communicated with the outputting fluid tube and thereby allows a floating operation. The second position allows the first fluid chamber and the first accumulator to be communicated with each other, allows the second fluid chamber and the second accumulator to be communicated with each other, and thereby allows an anti-vibration operation.

Further another hydraulic system for a working machine of the present invention, includes a hydraulic actuator, a float switching valve to perform a floating operation of the hydraulic actuator, an anti-vibration switching valve to perform an anti-vibration operation of the hydraulic actuator, and a control valve to stop the anti-vibration operation performed by the anti-vibration switching valve when the float switching valve performs the floating operation.

Further another hydraulic system for a working machine of the present invention, includes a hydraulic actuator, a float switching valve to perform a floating operation of the hydraulic actuator, an anti-vibration switching valve to perform an anti-vibration operation of the hydraulic actuator. The float switching valve or the anti-vibration switching valve includes a solenoid valve to which the operation fluid serving as a pilot fluid is supplied, a pressure-receiving portion to receive a pressure of the pilot fluid supplied to the solenoid valve, an inner fluid tube to connect the solenoid valve to the pressure-receiving portion, and an outputting fluid tube to output the operation fluid of the inner fluid tube.

Further another hydraulic system for a working machine of the present invention, includes a hydraulic actuator, a float switching valve to perform a floating operation of the hydraulic actuator, an anti-vibration switching valve to perform an anti-vibration operation of the hydraulic actuator. The float switching valve or the anti-vibration switching valve includes a solenoid valve to which the operation fluid serving as a pilot fluid is supplied, a pressure-receiving portion to receive a pressure of the pilot fluid supplied to the solenoid valve, and a spool including an outputting portion to connect the pressure-receiving portion to an outputting port of the switching valve.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4B is a view illustrating a float switching valve provided with the warm-up fluid tube according to the second embodiment;

DESCRIPTION OF THE EMBODIMENTS

Figure 1:
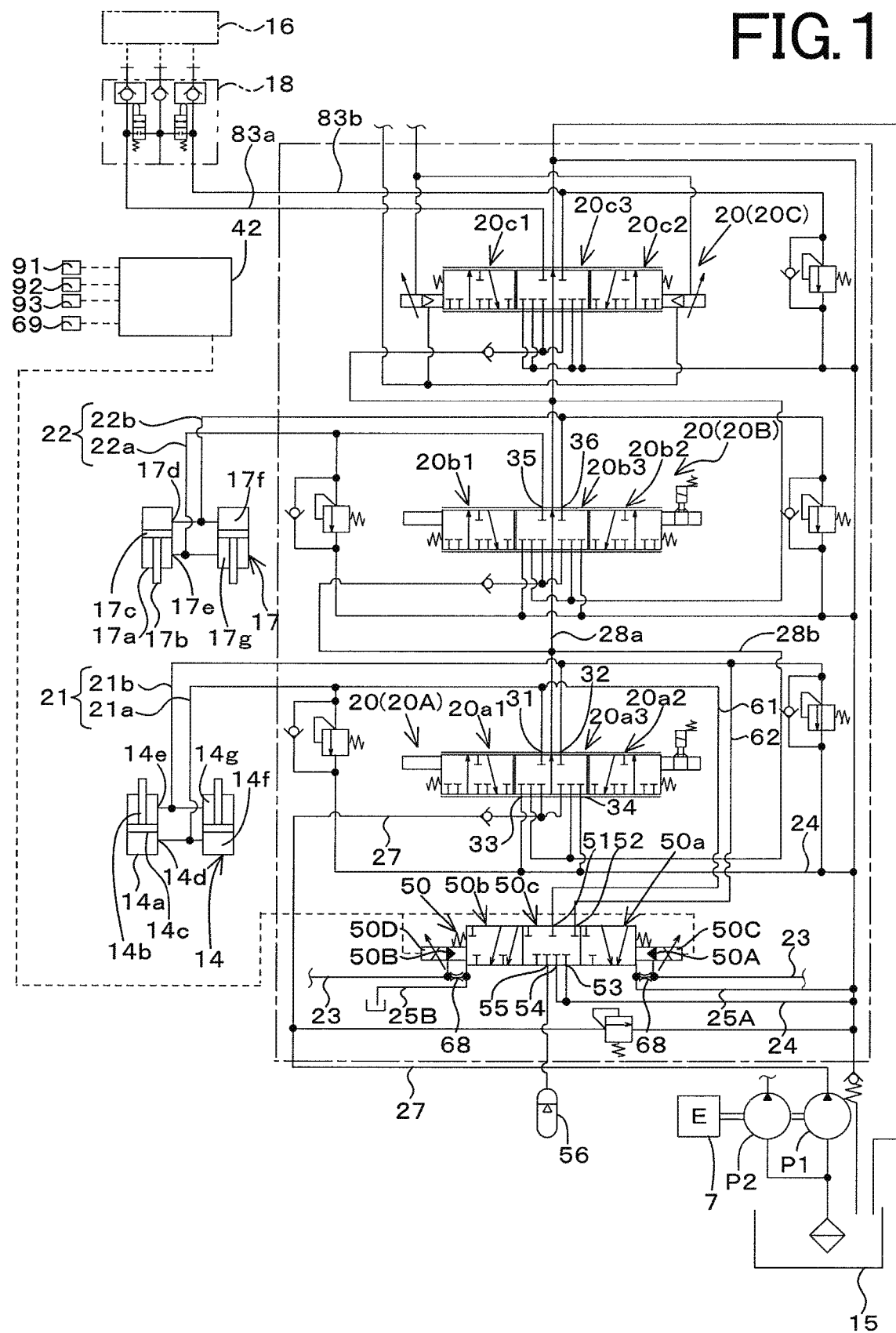
FIG. 1 is a view illustrating a hydraulic system (a hydraulic circuit) according to a first embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Referring to drawings, the embodiments of the present invention, a hydraulic system for a working machine and the working machine having the hydraulic system, will be described below.

First Embodiment

A working machine will be explained below.

Figure 6:
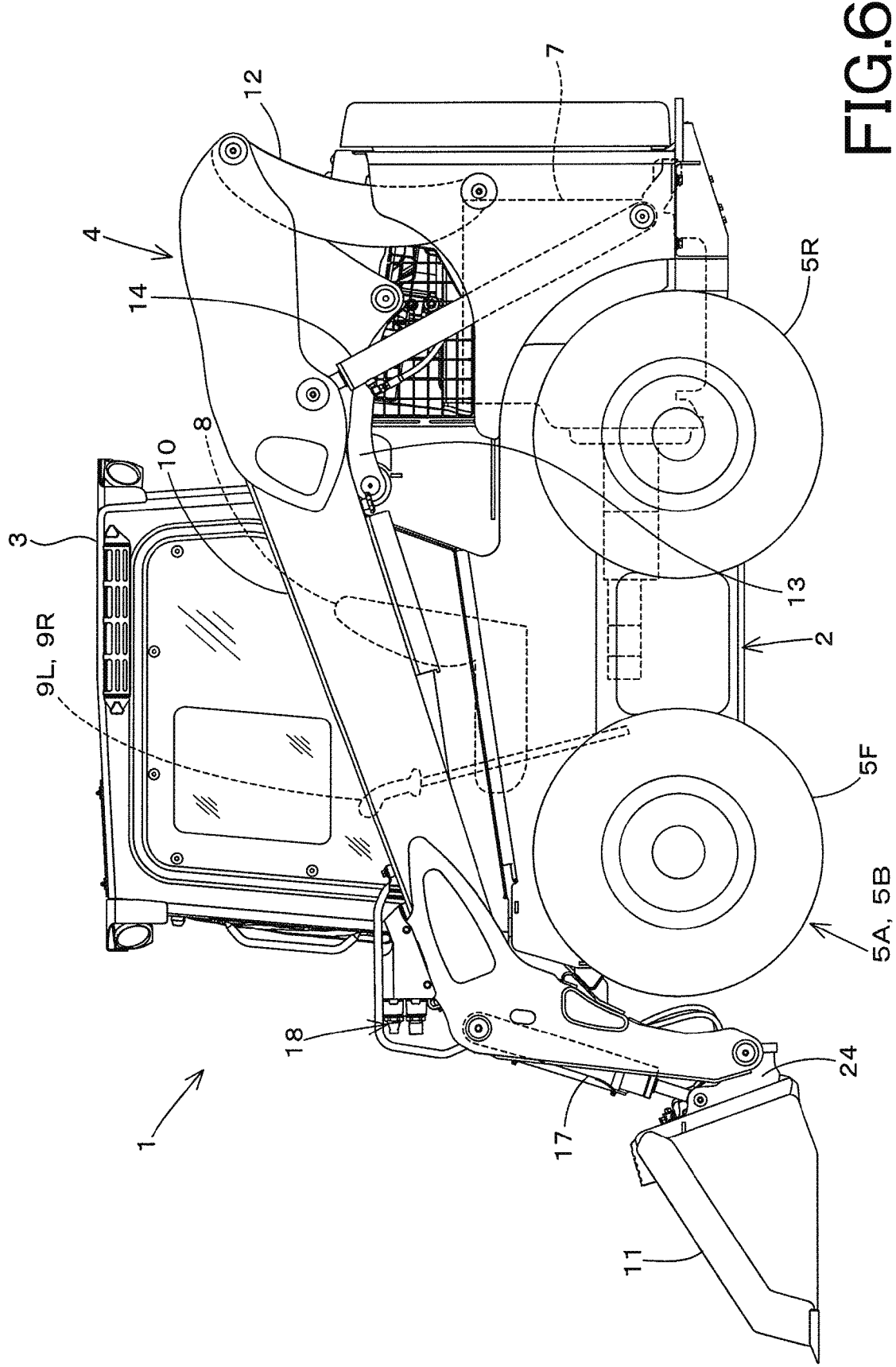
FIG. 6 is an overall view illustrating a skid steer loader exemplified as a working machine according to the embodiments of the present invention.

FIG. 6 illustrates a side view of a working machine 1 according to embodiments of the present invention. FIG. 6 illustrates a Skid Steer Loader (SSL) as an example of the working machine 1. However, the working machine 1 according to the embodiments is not limited to the Skid Steer Loader. The working machine 1 may be other types of the loader working machine such as a Compact Track Loader (CTL). In addition, the working machine 1 may be other types of working machine other than the loader working machine.

The working machine 1 includes a machine body (a vehicle body) 2, a cabin 3, an operation device 4, and traveling devices 5A and 5B.

The cabin 3 is mounted on the machine body 2. An operator seat 8 is disposed on a rear portion inside the cabin 3. Hereinafter, in explanations of all the embodiments of the present invention, a forward direction (a left side in FIG. 6) corresponds to a front side of an operator seated on an operator seat 8 of the working machine 1, a backward direction (a right side in FIG. 6) corresponds to a back side of the operator, a leftward direction (a front surface side of the sheet of FIG. 6) corresponds to a left side of the operator, and a rightward direction (a back surface side of the sheet of FIG. 6) corresponds to a right side of the operator. Additionally in the explanations, a machine width direction corresponds to a horizontal direction (a lateral direction) perpendicular to the front to rear direction. A machine outward direction corresponds to a direction from a center portion of the machine body 2 to the right portion of the machine body 2 and to the left portion of the machine body 2.

In other words, the machine outward direction corresponds to the machine width direction, especially corresponds to a direction separating from the machine body 2. In the explanation, a machine inward direction corresponds to a direction opposite to the machine outward direction. In other words, the machine inward direction corresponds to the machine width direction, especially corresponds to a direction approaching the machine body 2 from the outside of the machine body 2.

The cabin 3 is mounted on the machine body 2. The operation device 4 is constituted of a device configured to perform the working, the operation device 4 being attached to the machine body 2. The traveling device 5A is constituted of a device configured to allow the machine body 2 to travel, the traveling device 5A being disposed on the left side of the machine body 2. The traveling device 5B is constituted of a device configured to allow the machine body 2 to travel, the traveling device 5A being disposed on the right side of the machine body 2. A prime mover (an engine or an electric motor) 7 is mounted on a rear portion of the machine body 2 internally. The prime mover 7 is constituted of a diesel engine (that is, an engine). Meanwhile, the prime mover 7 is not limited to the engine, and may be constituted of an electric motor or the like.

A travel lever 9L is disposed on the left side of the operator seat 8. A travel lever 9R is disposed on the right side of the operator seat 8. The travel lever 9L on the left side is used for operating the traveling device 5A on the left side. The travel lever 9R on the right side is used for operating the traveling device 5A on the right side.

The operation device 4 includes booms 10, a bucket (a working tool) 11, lift links 12, control links 13, boom cylinders 14, and bucket cylinders 17. The operation device 4 includes two booms 10; one of the booms 10 is provided on a right side of the cabin 3 (referred to as the right boom 10) and is capable of freely swinging upward and downward, and the other one of the booms 10 is provided on a left side of the cabin 3 (referred to as the left boom 10) and is capable of freely swinging upward and downward. The working tool 11 is a bucket (hereinafter referred to as a bucket 11), for example. The bucket 11 is disposed on tip portions (front end portions) of the booms 10 and is capable of being freely swung upward and downward. The lift link 12 and the control link 13 support a base portion (a rear portion) of the boom 10 such that the boom 10 is capable of being freely swung upward and downward. The boom cylinder 14 is capable of being stretched and shortened to move the boom 10 upward and downward. The bucket cylinder 15 is capable of being stretched and shortened to swing the bucket 11.

In particular, the operation device 4 includes two lift links 12, two control links 13, and two boom cylinders 14. One of the lift links 12 (the right lift link 12), one of the control links 13 (the right control link 13), and one of the boom cylinders 14 (the right boom cylinder 14) are disposed on a right side of the machine body 2, corresponding to the right boom 10. And, the other one of the lift links 12 (the left lift link 12), the other one of the control links 13 (the left control link 13), and the other one of the boom cylinders 14 (the left boom cylinder 14) are disposed on a left side of the machine body 2, corresponding to the left boom 10. The lift link 12 is vertically disposed on a rear portion of the base portion of the boom 10. The lift link 12 is pivotally supported at an upper portion (one end side) of the lift link 12 by an upper portion of a base portion of the boom 10. In addition, the lift link 12 is pivotally supported at a lower portion (the other end side) of the lift link 12 by a side portion of the rear portion of the machine body 2. The control link 13 is arranged forward from the lift link 12. One end of the control link 13 is pivotally supported by a lower portion of the base portion of the boom 10. The other end of the control link 13 is pivotally supported by the machine body 2.

The boom cylinder 14 is constituted of a hydraulic cylinder configured to move the boom 10 upward and downward. The boom cylinder 14 is pivotally supported at an upper portion of the boom cylinder 14 by a front portion of the base portion of the boom 10. The boom cylinder 14 is pivotally supported at a lower portion of the boom cylinder 14 by the side portion of the rear portion of the machine body 2. When the boom cylinder 14 is stretched and shortened, the boom 10 is swung upward and downward by the lift link 12 and the control link 13. The bucket cylinder 17 is constituted of a hydraulic cylinder configured to swing the bucket 11.

The bucket cylinder 17 connects the boom on the left to a left portion of the bucket 11 between the boom on the left and the left portion of the bucket 11, and connects the boom on the right to a right portion of the bucket 11 between the boom on the right and the right portion of the bucket 11. Not only the bucket 11, other working tools can be attached to the tip end (the front portion) of the boom 10. The following attachments (spare attachments) are exemplified as the other working tools; for example, a hydraulic crusher, a hydraulic breaker, an angle broom, an earth auger, a pallet fork, a sweeper, a mower, a snow blower, and the like.

In the embodiment, each of the travel device 5A and the travel device 5B employs a wheeled travel device having a front wheel 5F and a rear wheel 5R. However, each of the travel device 5A and the travel device 5B may employ a crawler travel device (including a semi-crawler travel device).

Next, a working hydraulic circuit (a working hydraulic system) disposed on the skid steer loader 1 will be described below.

The working hydraulic system is constituted of a system configured to operate the boom 10, the bucket 11, an auxiliary attachment, and the like, and, as shown in FIG. 1, includes a plurality of control valves 20 and a hydraulic pump (a first hydraulic pump) P1 for the working hydraulic system. In addition, the working hydraulic system includes a second hydraulic pump P2 other than the first hydraulic pump P1. And, the working hydraulic system is provided with a tank (a hydraulic operation fluid tank) 15 configured to store a hydraulic operation fluid (also referred to as an operation fluid).

The first hydraulic pump P1 is a pump configured to be operated by the power of the prime mover 7, and specifically is constituted of a constant-displacement type gear pump. The first hydraulic pump P1 is configured to output the operation fluid stored in the tank (the hydraulic operation fluid tank) 15. The second hydraulic pump P2 is a pump configured to be operated by the power of the prime mover 7, and specifically is constituted of a constant-displacement type gear pump.

The second hydraulic pump P2 is configured to output the hydraulic fluid stored in the tank (the hydraulic fluid tank) 15. Meanwhile, in the hydraulic system for the working machine 1, the second hydraulic pump P2 outputs the hydraulic fluid for signals and the hydraulic fluid for control. The hydraulic fluid for signals and the hydraulic fluid for control are referred to as a pilot fluid.

The plurality of control valves 20 are valves configured to control various types of hydraulic actuators disposed on the working machine 1. The hydraulic actuator is constituted of a device configured to be operated by the operation fluid, such as a hydraulic cylinder, a hydraulic motor, or the like.

In this embodiment, the plurality of control valves 20 include a first control valve 20A, a second control valve 20B, and a third control valve 20C.

The first control valve 20A is constituted of a valve configured to control the hydraulic actuator (the boom cylinder) 14 that moves the boom 10. The first control valve 20A is constituted of a direct-acting spool type three-position switching valve. The first control valve 20A is switched to a neutral position 20a3, a first position 20a1 other than the neutral position 20a3, and the second position 20a2 other than the neutral position 20a3 and the first position 20a1. In the first control valve 20A, the spool is moved by operation of the operation member, and thereby the first control valve 20A is switched between the neutral position 20a3, the first position 20a1, and the second position 20a2.

Meanwhile, the operating member is manually operated to directly move the spool, and thereby the first control valve 20A is switched. However, it is also possible to move the spool in the hydraulic operation (the hydraulic operation with a pilot valve or the hydraulic operation with a proportional valve), it is possible to move the spool in the electric operation (the electric operation by magnetically exciting the solenoid), or it is possible to move the spool in other methods.

The first control valve 20A and the first hydraulic pump P1 are connected to each other by an outputting fluid tube 27. The operation fluid outputted from the first hydraulic pump P1 passes through the outputting fluid tube 27 and then is supplied to the first control valve 20A. In addition, the first control valve 20A and the boom cylinder 14 are connected to each other by a first fluid tube 21.

More specifically, the boom cylinder 14 includes a cylinder body 14a, a piston 14c disposed inside the cylinder body 14a, and a rod 14b connected to the piston 14c. The piston 14c is configured to be movable in the axial direction in the cylinder body 14a. The piston 14c partitions the inside of the cylinder body (the cylinder tube) 14a into a first fluid chamber 14f and a second fluid chamber 14g. The first fluid chamber 14f is an fluid chamber disposed on the bottom side of the cylinder body 14a (on the side opposite to the rod 14b side). The second fluid chamber 14g is a fluid chamber disposed on the rod side of the cylinder body 14a.

A first port 14d is disposed on a base end portion (the side opposite to the rod 14b side) of the cylinder body 14a, the first port 14d being constituted of a port configured to supply and output the operation fluid and communicating with the first fluid chamber 14f. A second port 14e is disposed on the tip end (on the rod 14b side) of the cylinder body 14a, the second port 14e being constituted of a port configured to supply and output the operation fluid and communicating with the second fluid chamber 14g.

The first fluid tube 21 has a first supplying tube 21a and a second supplying tube 21b, the first supplying tube 21a connecting the first port 31 and the first port 14d of the first control valve 20A each other, the second supplying tube 21b connecting the second port 14e and the second port 32 of the first control valve 20A each other.

Thus, when the first control valve 20A is set to the first position 20a1, the operation fluid is supplied from the first supplying tube 21a to the first port 14d (the first fluid chamber 14f) of the boom cylinder 14, and the operation fluid is supplied from the second port 14e (the second fluid chamber 14g) of the boom cylinder 14 to the second supplying tube 21b.

In this manner, the boom cylinder 14 is stretched, and thus the boom 10 moves upward. When the first control valve 20A is set to the second position 20a2, the operation fluid is supplied from the second supplying tube 21b to the second port 14e (the second fluid chamber 14g) of the boom cylinder 14, and the operation fluid is outputted from the first port 14d of the boom cylinder 14 to the first supplying tube 21a. In this manner, the boom cylinder 14 is shortened, and the boom 10 moves downward.

In addition, the first control valve 20A has a first outputting port 33 and a second outputting port 34. The first outputting port 33 and the second outputting port 34 are connected to an outputting fluid tube 24, the outputting fluid tube 24 being connected to the operation fluid tank 15.

The second control valve 20B is constituted of a valve constituted to control the hydraulic actuator (the bucket cylinder) 17, the hydraulic actuator 17 being configured to move the bucket 11. The second control valve 20B is constituted of a direct-acting three-position switching valve having a spool. The second control valve 20B is switched to a neutral position 20b3, to a first position 20b1 other than the neutral position 20b3, and to a second position 20b2 other than the neutral position 20b3 and the first position 20b1. In the second control valve 20B, the spool is moved by operation of the operation member, and thereby the second control valve 20B is switched between the neutral position 20b3, the first position 20b1, and the second position 20b2.

Meanwhile, the operating member is manually operated to directly move the spool, and thereby the second control valve 20B is switched. However, it is also possible to move the spool in the hydraulic operation (the hydraulic operation with a pilot valve or the hydraulic operation with a proportional valve), it is possible to move the spool in the electric operation (the electric operation by magnetically exciting the solenoid), or it is possible to move the spool in other methods. For convenience of explanation, the hydraulic actuator (the bucket cylinder) 17 may be referred to as a second hydraulic actuator 17.

The second control valve 20B and the first control valve 20A are connected to each other by a first supplying-outputting fluid tube 28a and a second fluid supplying-outputting fluid tube 28b. When the first control valve 20A is in the neutral position 20a3, the operation fluid is supplied to the second control valve 20B through the first fluid supplying-outputting fluid tube 28a. In addition, when the first control valve 20A is in the first position 20a1 or the second position 20a2, the operation fluid is supplied to the second control valve 20B through the second supplying-outputting fluid tube 28b.

The second control valve 20B and the second hydraulic actuator 17 are connected to each other by a second fluid tube 22. In particular, the second hydraulic actuator (the bucket cylinder) 17 includes a cylinder body 17a, a piston 17c, and a rod 17b, the piston 17c being disposed on the cylinder body 17a so as to be movable in the axial direction, the rod 17b being connected to the piston 17c. The piston 17c partitions the inside of the cylinder tube 17a into a first fluid chamber 17f and a second fluid chamber 17g.

The first fluid chamber 17f is a fluid chamber disposed on the bottom side of the cylinder body 17a (on the side opposite to the rod 17b side). The second fluid chamber 17g is a fluid chamber disposed on the rod side of the cylinder body 17a. A first port 17d is disposed on the base end portion of the cylinder body 17a (on the side opposite to the rod 17b side), the first port 17d being a port configured to supply and output the operation fluid and communicating with the first fluid chamber 17f. A second port 17e is disposed on the tip end of the cylinder body 17a (on the side of the rod 17b), the second port 17e being a port configured to supply and output the operation fluid and communicating with the second fluid chamber 17g.

The second fluid tube 22 includes a first supplying tube 22a and a second supplying tube 22b, the first supplying tube 22a connecting the second port 17e and the first port 35 of the second control valve 20B to each other, the second supplying tube 22b connecting the first port 17d and the second port 36 of the second control valve 20B to each other.

Thus, when the second control valve 20B is set to the first position 20b1, the operation fluid is supplied from the first supplying tube 22a to the second port 17e (the second fluid chamber 17g) of the bucket cylinder 17, and the operation fluid is outputted from the first port 17d (the first fluid chamber 17o of the bucket cylinder 17 to the second supplying tube 22b. In this manner, the bucket cylinder 17 is shortened, and thereby the bucket 11 performs the shoveling operation.

When the first control valve 20A is set to the second position 20a2, the operation fluid is supplied from the second supplying tube 22b to the first port 17d (the first fluid chamber 17o of the bucket cylinder 17, and the operation fluid is outputted from the second port 17e (the second fluid chamber 17g) of the bucket cylinder 17 to the first supplying tube 22a. In this manner, the bucket cylinder 17 is stretched, and thereby the bucket 11 performs the dumping operation.

The third control valve 20C is constituted of a valve configured to control the hydraulic actuator 16 (the hydraulic cylinder, the hydraulic motor, and the like), the hydraulic actuator 16 being mounted on the auxiliary attachment. The third control valve 20C is constituted of a direct-acting three-position switching valve having a spool configured to be operated by the pilot fluid. The third control valve 20C is configured to be switched to a neutral position the first position 20c1 different from the neutral position 20c3 and a neutral position 20c3, a first position 20c1 other than the neutral position 20c3, and the second position 20c2 other than the neutral position 20c3 and the first position 20c1.

In the third control valve 20C, the spool is moved by the pressure of the pilot fluid, and thereby the third control valve 20C is switched between the neutral position 20c3, the first position 20c1, and the second position 20c2. A connecting member 18 is connected to the third control valve 20C by the supplying-outputting fluid tubes 83a and 83b. An fluid tube is connected to the connecting member 18, the fluid tube being connected to the hydraulic actuator 16 of the auxiliary attachment.

Thus, when the third control valve 20C is set to the first position 20c1, the operation fluid is supplied from the supplying-outputting fluid tube 83a to the hydraulic actuator 16 of the auxiliary attachment. When the third control valve 20C is set to the second position 20c2, the operation fluid is supplied from the supplying-outputting fluid tube 83b to the hydraulic actuator 16 of the auxiliary attachment. In this manner, the operation fluid is supplied from the supplying-outputting fluid tube 83a or the supplying-outputting fluid tube 83b to the hydraulic actuator 16, and thereby the hydraulic actuator 16 (the auxiliary attachment) is operated.

Then, the hydraulic system for the working machine 1 suppresses the fluctuation of the pressure of the hydraulic actuator, thereby suppressing the traveling vibration of the working machine 1 (carrying out the anti-vibration operation of the machine body 2). That is, it is possible to carry out the ride control. Further, the hydraulic system for the working machine 1 outputs the operation fluid in the hydraulic actuator, and thereby the hydraulic system carries out the floating operation.

The hydraulic system for the working machine 1 is provided with a switching valve (an operational switching valve) 50 configured to switch the operation between the anti-vibration operation and the floating operation. The switching valve 50 is constituted of a three-position switching valve configured to be switched between a first position 50a, a second position 50b, and a neutral position 50c. The switching valve 50 carries out the floating operation in the case where the switching valve 50 is in the first position 50a, carries out the anti-vibration operation in the case where the switching valve 50 is in the second position 50b, and stops the anti-vibration operation and the floating operation in the case where the switching valve 50 is in the neutral position 50c.

Hereinafter, the switching valve 50 will be described in detail blow.

The switching valve 50 has a first port 51, a second port 52, a third port 53, a fourth port 54, and a fifth port 55. A first communicating tube 61 is connected to the first port 51, the first communicating tube 61 being connected to the first supplying tube 21a. A second communicating tube 62 is connected to the second port 52, the second communicating tube 62 being connected to the second supply channel 21b. The third port 53 and the fourth port 54 are connected to an outputting fluid tube 24, the outputting fluid tube 24 being connected to the operation fluid tank 15. An accumulator 56 is connected to the fifth port 55, the accumulator 56 serving as a pressure accumulator.

In addition, the switching valve 50 is constituted of a pilot type switching valve incorporating a solenoid valve (an electromagnetic proportional valve). The switching valve 50 is provided with a first pressure-receiving portion 50A, a second pressure-receiving portion 50B, a first solenoid 50C, and a second solenoid 50D. The first pressure-receiving portion 50A is configured to receive a pressure of the operation fluid (the pilot fluid). The second pressure-receiving portion 50B is configured to receive a pressure of the pilot fluid. The first pressure-receiving portion 50A is arranged on one side of the spool in the longitudinal direction, and the second pressure-receiving portion 50B is arranged on the other side of the spool in the longitudinal direction. An fluid tube (a pilot supplying tube) 23 is connected to the first pressure-receiving portion 50A and to the second pressure-receiving portion 50B, the fluid tube 23 being connected to the second hydraulic pump P2, and thereby the operation fluid (the pilot fluid) is supplied to the first pressure-receiving portion 50A and to the second pressure-receiving portion 50B.

When the first solenoid 50C is magnetized, the pilot pressure received by the first pressure-receiving portion 50A is applied to the spool, the spool is moved to one direction, and thereby the switching valve 50 is switched to the first position 50a. When the second solenoid 50D is magnetized, the pilot pressure received by the second pressure-receiving portion 50B is applied to the spool, the spool is moved to the other direction, and thereby the switching valve 50 is switched to the second position 50b. When one of the first solenoid 50C and the second solenoid 50D is demagnetized, the spool stays at the neutral position, and thus the switching valve 50 is switched to the neutral position 50c.

When the switching valve 50 is set to the first position 50a, the first port 51 and the fourth port 54 are connected to each other by a spool. In this manner, the operation fluid in the first fluid chamber 14f of the boom cylinder 14 flows through the first supplying tube 21a, the first communicating tube 61, the first port 51 and the fourth port 54, and then is outputted to the outputting fluid tube 24. In addition, when the switching valve 50 is set to the first position 50a, the second port 52 and the third port 53 are connected to each other by the spool. In this manner, the operation fluid in the second fluid chamber 14g of the boom cylinder 14 flows through the second supplying tube 21b, the second communicating tube 62, the second port 52, and the third port 53, and then is outputted to the outputting fluid tube 24.

That is, when the switching valve 50 is in the first position 50a, the first communicating tube 61 and the second communicating tube 62 communicate with the outputting fluid tube 24 by the spool, and the operation fluid in the first fluid chamber 14f and the second fluid chamber 14g is outputted to the outputting fluid tube 24, thereby carrying out the floating operation.

In addition, when the switching valve 50 is set to the second position 50b, the first port 51 and the fifth port 55 are connected to each other by the spool. In this manner, the first fluid chamber 14f of the boom cylinder 14 passes through the first supplying tube 21a, the first communicating tube 61, the first port 51, and the fifth port 55, and then connects to the accumulator 56. In addition, when the switching valve 50 is set to the second position 50b, the second port 52 and the third port 53 are connected to each other by the spool, and thereby the operation fluid in the second fluid chamber 14g of the boom cylinder 14 passes through the second supplying tube 21b, the second communicating tube 62, the second port 52, and the third port 53, thereby being outputted to the outputting fluid tube 24.

That is, when the switching valve 50 is in the second position 50b, the first communicating tube 61 communicates with the accumulator 56, and the second communicating tube 62 is made communicate with the outputting fluid tube 24 by the spool (the fluid chamber 14f communicates with the accumulator 56, and the second fluid chamber 14g is made communicate with the outputting fluid tube 24), thereby carrying out the anti-vibration operation.

As described above, by carrying out the anti-vibration operation, even when the bucket 11 vibrates upward and downward while the working machine 1 is traveling, the accumulator 56 absorbs the pressure fluctuations in the first fluid chamber 14f of the boom cylinder 14, thereby suppressing the traveling vibrations of the working machine 1.

The switching control to the switching valve 50 is carried out by the control device 42. The control device 42 is constituted of a CPU or the like, and carries out the switching of the switching valve 50 between the floating operation and the anti-vibration operation. A first switch 91 and a second switch 92 are connected to the control device 42. The first switch 91 and the second switch 92 are arranged in the vicinity of the operator seat 8. An operator seated on the operator seat 8 can operate the first switch 91 and the second switch 92.

The first switch 91 is constituted of a switch configured to be switched to be between on and off, and when switched to be on, issues a first command of the floating operation to the control device 42. When the first switch 91 is switched to be off, the first switch 91 does not issue the first command to the control device 42.

When the control device 42 obtains the first command issued from the first switch 91, the control device 42 outputs a control signal to the first solenoid 50C of the switching valve 50, and thereby magnetizes the first solenoid 50C. In addition, the control device 42 outputs a control signal to the first solenoid 50C of the switching valve 50 under a state where the control device 42 has not obtained the first command of the first switch 91 yet (OFF), and thereby demagnetizes the first solenoid 50C.

The second switch 92 is constituted of a switch configured to be switched to be between on and off, and when switched to be on, issues a second command of the anti-vibration operation to the control device 42. When the second switch 92 is switched to be off, the second switch 92 does not issue the second command to the control device 42. When the control device 42 obtains the second command issued from the second switch 92, the control device 42 outputs a control signal to the second solenoid 50D of the switching valve 50, and thereby magnetizes the second solenoid 50D. In addition, the control device 42 outputs a control signal to the second solenoid 50D of the switching valve 50 under a state where the control device 42 has not obtained the second command of the second switch 92 yet, and thereby demagnetizes the first solenoid 50D.

When the first switch is turned on from off during the anti-vibration operation carried out in accordance with the second switch 92 switched to be on, the control device 42 stops the anti-vibration operation, the anti-vibration operation carried out in accordance with the second switch 92 switched to be on. That is, when the first switch 91 is turned on and the first command is inputted under the state where the second solenoid 50D is magnetized in accordance with the second command (the switching valve 50 is in the second position 50b), the first command is prioritized over the second command, and then the second solenoid 50D is demagnetized even when the second switch 92 is on. On the other hand, the first solenoid 50C is magnetized, and thereby the switching valve 50 is switched to the first position 50a.

According to the control device 42, the floating operation and the anti-vibration operation can be easily switched by the first switch 91 and the second switch 92, and additionally when the commands for both of the floating operation and the anti-vibration operation are issued, the floating operation is prioritized over the anti-vibration operation, thereby improving the efficiency of the operation carried out by the working machine 1.

In addition, the hydraulic system has the configuration where either the anti-vibration operation or the floating operation is switched by the switching valve (the operational switching valve) 50, and thus the switching valve 50 reduces the operation fluid outputted from the switching valve in comparison with the case where the switching valve for the anti-vibration operation and the switching valve for the floating operation are operated at the same time in the hydraulic circuit having the configuration where the switching valve for the anti-vibration operation and the switching valve for the floating operation are separately provided.

In addition, in a hydraulic circuit where a switching valve for the anti-vibration operation and a switching valve for the floating operation are separately provided, the switching valve leaks the operation fluid when the anti-vibration operation is stopped, and the switching valve leaks the operation fluid when the floating operation is stopped. Both of the leakings provides the amount of the leakings (the total amount of the leakings). On the other hand, since the switching valve (the operational switching valve) 50 is one valve configured to switch the operation between the anti-vibration operation and the floating operation, the switching valve 50C reduces a leaking amount from the switching valve 50 in comparison with the total amount of the leakings.

In addition, in the switching valve 50, it is possible to reduce the number of constituent parts as compared with the case of the configuration where the switching valve for the anti-vibration operation and the switching valve for the floating operation are provided.

Figure 2A:
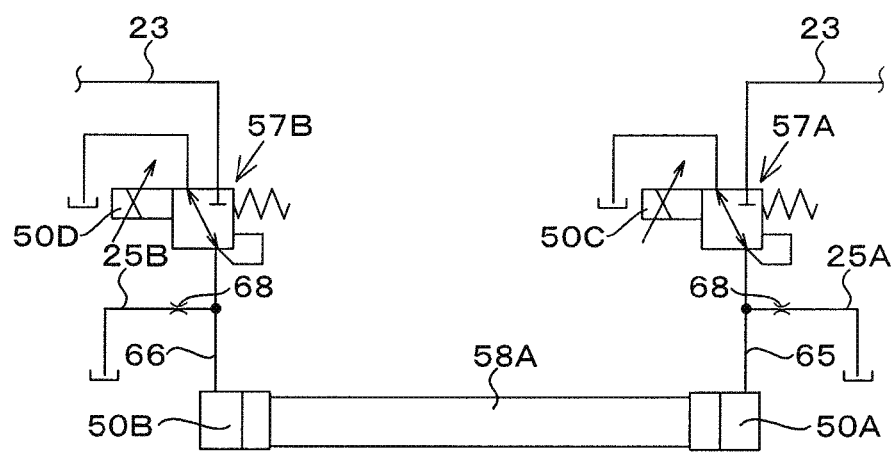
FIG. 2A is a view illustrating a switching valve (an operational switching valve) provided with a warm-up fluid tube according to the first embodiment.

Meanwhile, the switching valve 50 may have a configuration to warm up the pilot fluid. FIG. 2A is a view showing a part of the inside of the switching valve 50 with a hydraulic circuit. That is, the switching valve 50 shown in FIG. 1 and the switching valve 50 in FIG. 2A are equivalent to each other. As shown in FIG. 2A, the pilot supplying tube 23 is connected to the first solenoid valve 57A having the first solenoid 50C and to the second solenoid valve 57B having the second solenoid 50D. The first solenoid valve 57A and the first pressure-receiving portion 50A are connected to each other by the first inner fluid path 65, and the second solenoid valve 57B and the first pressure-receiving portion 50B are connected to each other by the second inner fluid tube 66. An outputting fluid tube 25A is disposed on the intermediate portion of the first inner fluid tube 65, and the outputting fluid tube 25A is connected to the operation fluid tank 15.

In addition, an outputting fluid tube 25B is disposed on the intermediate portion of the second inner fluid tube 66, and the outputting fluid tube 25B is connected to the operation fluid tank 15. Meanwhile, the inner diameters of the outputting fluid tube 25A and the outputting fluid tube 25B are smaller than the inner diameters of the first inner fluid tube 65 and the second inner fluid tube 66, and thereby the throttling portion 68 is formed. And, FIG. 2A schematically shows the spool 58.

In this manner, by opening at least one of the first electromagnetic valve 57A and the second electromagnetic valve 57B in the switching valve 50, the pilot fluid flows from the first inner fluid tube 65 to the first pressure-receiving portion 50A or from the second inner fluid tube 66 to the second pressure-receiving portion 50B, and also is outputted to the outputting fluid tubes 25A and 25B.

In the case of warming up the pilot fluid, the degree of opening aperture of the first solenoid valve 57A or of the second solenoid valve 57B, that is, the pressure of the operation fluid applied to the first pressure-receiving portion 50A and to the second pressure-receiving portion 50B (a received pressure) is set to be lower than a switching pressure at which the spool 58A is switched to any one of the switching positions (the first position 50a and the second position 50b), and then substantially the entire amount of the operation fluid supplied to the first inner fluid tube 65 and to the second inner fluid tube 66 is outputted to the outputting fluid tube 25A and to the outputting fluid tube 25B.

For example, a measuring device 69 is connected to the control device 42, the measuring device 69 being configured to measure the temperature of the operation fluid. In the case where the temperature measured by the measuring device 69 is low [the temperature range where the viscosity of the operation fluid is high (for example, −10° C.)], the first solenoid valve 57A or the second solenoid valve 57B is opened to control the inside of the pressure-receiving portion (the inside of the inner fluid tube) to be lower than the switching pressure (performs the warm-up processing).

Under a state where the first solenoid valve 57A and the second solenoid valve 57B are opened for the warming up to preliminarily pressurizing the operation fluid (the pilot fluid) (under the warm-up processing), it is preferred that the control device 42 prohibits the floating operation or the braking operation and does not perform the switching in the switching valve 50 (holds the neutral position 50c).

In particular, even when the control device 42 obtains the first command and the second command during the warm-up processing, the control device 42 maintains the opening apertures of the first solenoid valve 57A and the second solenoid valve 57B to be smaller than the opening apertures corresponding to the switching pressure. Then, when the warm-up processing is completed, the control device 42 fully closes the first solenoid valve 57A and the second solenoid valve 57B once, and outputs the operation fluid in the inner fluid tube (the first inner fluid tube 65 and the second inner fluid tube 66) to the operation fluid tank 15 and the like. And then, after the first solenoid valve 57A and the second solenoid valve 57B are once fully closed, the control device 42 switches the switching valve 50 in accordance with the commands of the first switch 91 and the second switch 92.

As described above, when the switching to the floating operation or to the braking operation is prohibited during the warm-up processing, the positions of the spool 58A at the starts of the switchings to the floating operation and to the braking operation are set to substantially the same position (to the adequate neutral position 50c) (that is, the spool 58A starts to move from a constant position with suppression of the influence of hysteresis), and thus the switching valve 50 is switched more smoothly.

The stoppage of the warm-up processing by the control device 42 is carried out when the temperature of the operation fluid detected by the measuring device 69 reaches a predetermined temperature [a temperature range where the viscosity of the operation fluid is low (−10° C. or more or 0° C. or more)]. Additionally in the example mentioned above, the temperature of the operation fluid is measured by the measuring device 69, and the warm-up processing is performed based on the measured temperature. However, the warm-up processing may be performed in accordance with a command from a switch and the like.

For example, the control device 42 is provided with a third switch 93 configured to be switched between on and off. Then, the control device 42 performs the warm-up processing when the third switch 93 is on, and when the third switch 93 is off, the control device 42 performs the normal processing, for example, performs the floating operation and the anti-vibration operation each carried out by the first switch 91 and the second switch 92. In addition, the above-described temperature of the operation fluid is merely an example, and the present invention is not limited thereto.

In the embodiment described above, the first solenoid valve 57A or the second solenoid valve 57B is opened when the warm-up processing is performed. However, both of the first solenoid valve 57A and the second solenoid valve 57B may be opened to apply the pilot fluid to the first pressure-receiving portion 50A and to the second pressure-receiving portion 50B. For example, when the temperature measured by the measuring device 69 is low, the control device 42 opens the first solenoid valve 57A and the second solenoid valve 57B substantially at the same time, and thereby applies the pilot fluid to the first pressure-receiving portion 50A and to the first pressure-receiving portion 50B, thereby performing the warm-up processing.

In that case, in order to apply the pilot fluid to both the first pressure-receiving portion 50A and to the second pressure-receiving portion 50B, the first solenoid valve 57A and the second solenoid valve 57B need not to set the opening aperture to be less than the opening aperture corresponding to the switching pressure.

In FIG. 2A, the outputting fluid tubes 25A and 25B are disposed on the connecting fluid tube 65 and the second inner fluid tube 66, the connecting fluid tube 65 connecting the pressure-receiving portions (the first pressure-receiving portion 50A and the second pressure-receiving portion 50B) to the solenoid valves (the first solenoid valve 57A and the second solenoid valve 57B). However, as shown in FIG. 2B, the pressure-receiving portions (the first pressure-receiving portion 50A and the second pressure-receiving portion 50B) and an outputting portion 67 may be disposed on the spool 58A, the outputting portion 67 being connected to an outputting port T1 that is disposed inside the switching valve 50.

Figure 2B:
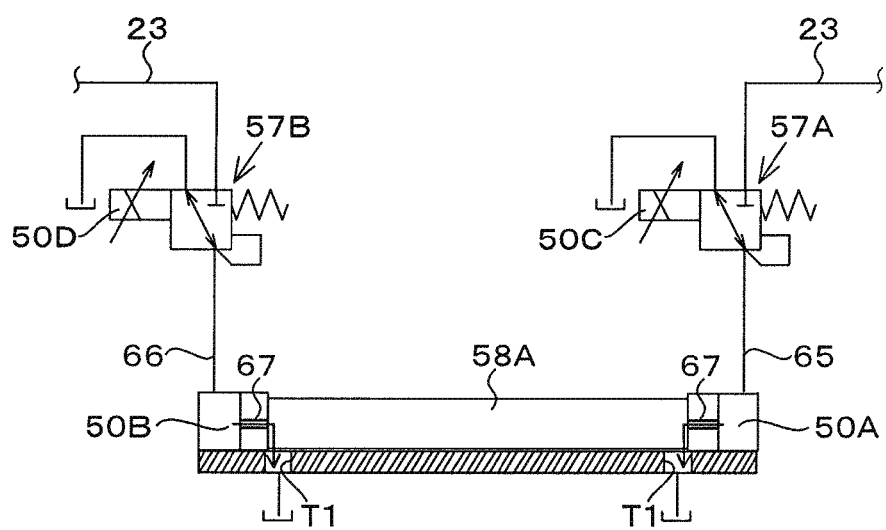
FIG. 2B is a view illustrating the switching valve (the operational switching valve) provided with the warm-up fluid tube according to the first embodiment.

For example, as shown in FIG. 2B, an outputting groove 67 is disposed on the spool 58A, the outputting groove being formed by cutting out the outer peripheral surface of the spool 58A on both end portions of the spool 58A in the longitudinal direction (on one end side corresponding to the first pressure-receiving portion 50A and on the other end side corresponding to the second pressure-receiving portion 50B). For example, when the switching valve 50 (the spool 58A) is in the neutral position 50c, the outputting port T1 is connected to the pressure-receiving portion 50A and the pressure-receiving portion 50B by the outputting groove 67. In this manner, the pilot fluid is warmed up.

Second Embodiment

Figure 3:
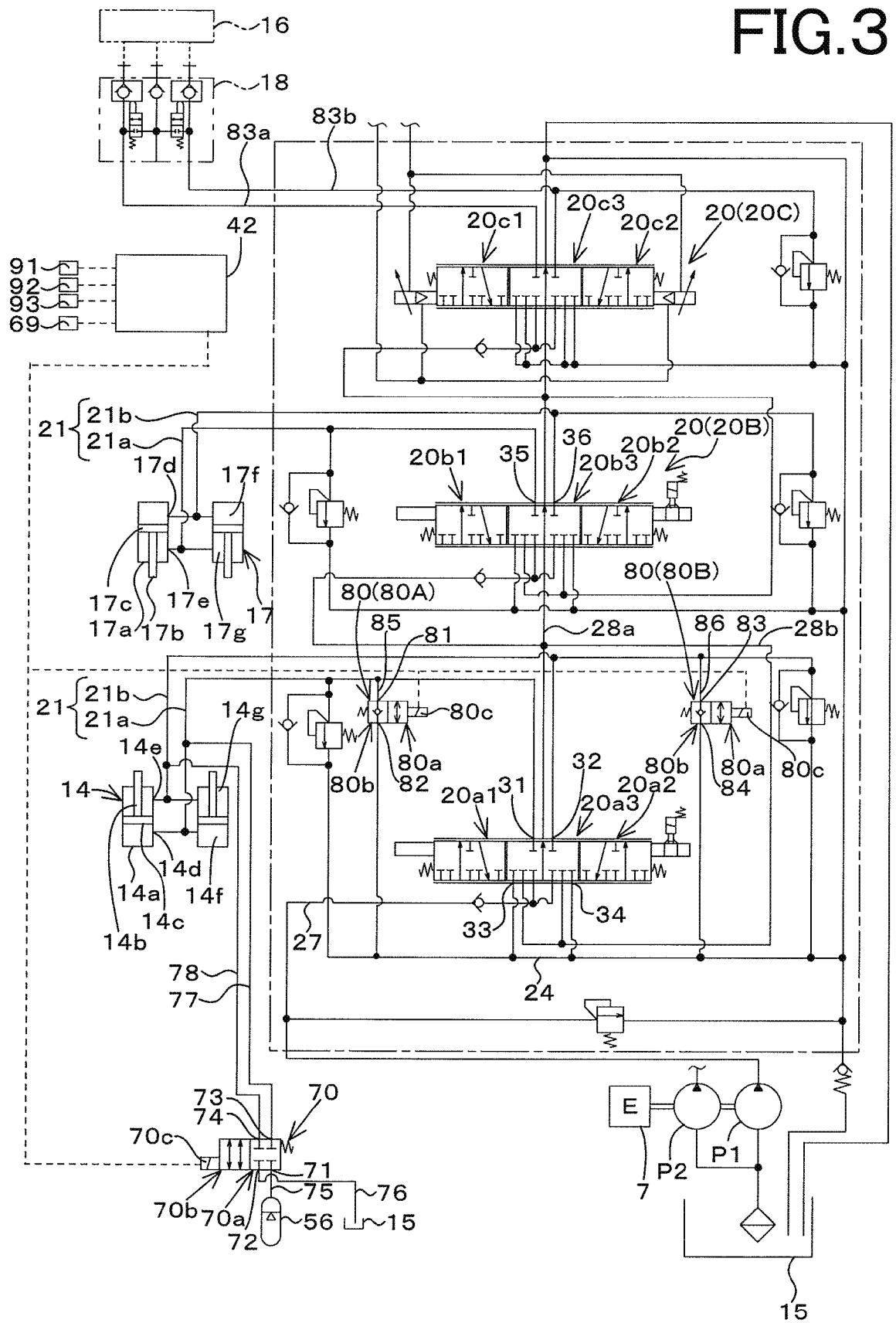
FIG. 3 is a view illustrating a hydraulic system (a hydraulic circuit) according to a second embodiment of the present invention.

FIG. 3 shows a hydraulic system according to a second embodiment of the present invention. The hydraulic system for the working machine 1 according to the second embodiment is a system configured to perform the floating operation and the anti-vibration operation separately from each other not by a single switching valve. In the second embodiment, configurational parts similar to those of the first embodiment are denoted by the same reference numerals, and explanations thereof will be omitted. In the second embodiment, configurations different from those of the first embodiment will mainly be described.

As shown in FIG. 3, the hydraulic system for the working machine 1 includes an anti-vibration switching valve 70 and a float switching valve 80.

The anti-vibration switching valve 70 is constituted of a two-position switching valve configured to be switched between an anti-vibration position 70a and a stop position 70b, the anti-vibration position 70a allowing the accumulator 56 and the boom cylinder 14 to communicate with each other and thereby to perform the anti-vibration operation, the stop position 70b allowing to block the communicating between the accumulator 56 and the boom cylinder 14 and thereby to stop the anti-vibration operation. In addition, the anti-vibration switching valve 70 is constituted of a solenoid switching valve configured to be switched to the stop position 70b by a spring and switched to the anti-vibration position 70a by magnetizing the solenoid 70c.

The anti-vibration switching valve 70 has a first port 71, a second port 72, a third port 73, and a fourth port 74. The first port 71 is connected to the accumulator 56 by a fluid tube 75. The second port 72 is connected to the outputting fluid tube 76. The third port 73 is connected to a third communicating tube 77 connected to the first supplying tube 21a. The fourth port 74 is connected to a fourth communicating tube 78 connected to the second supplying tube 21b.

When the second switch 92 is turned on, the control device 42 outputs a control signal to the solenoid 70c of the anti-vibration switching valve 70, and thereby magnetizes the solenoid 70c. In this manner, the anti-vibration switching valve 70 is switched to the anti-vibration position 70a, the first fluid chamber 14f of the boom cylinder 14 communicates with the accumulator 56, and the second fluid chamber 14g of the boom cylinder 14 communicates with the outputting fluid tube 76.

In addition, the control device 42 outputs a control signal to the solenoid 70c of the anti-vibration switching valve 70 under a state where the control device 42 does not obtain the second command issued from the second switch 92 (OFF), thereby demagnetizing the solenoid 70c. In this manner, the anti-vibration switching valve 70 is switched to the stop position 70b, the communicating between the first fluid chamber 14f of the boom cylinder 14 and the accumulator 56 is block, and the communication between the second fluid chamber 14g of the boom cylinder 14 and the outputting fluid tube 76 is blocked.

The float switching valve 80 includes a first float switching valve 80A and a second float switching valve 80B. Each of the first float switching valve 80A and the second float switching valve 80B is constituted of a two-position switching valve configured to be switched between a float position 80a and a block position 80b, the float position 80a allowing the first supplying tube 21a and the second supplying tube 21b to communicate with the outputting fluid tube 24, the block position 80b allowing to block the communicating between the outputting fluid tube 24 and the first supplying tube 21a and between the outputting fluid tube 24 and the second supplying tube 21b. In addition, the first float switching valve 80A and the second float switching valve 80B are configured to be switched to the block position 80b by a spring and switched to the float position 80a by magnetizing the solenoid 80c.

The first float switching valve 80A has a first port 81 and a second port 82. The first port 81 is connected to a fifth communicating tube 85 connected to a first supplying tube 21a. The second port 82 is connected to the outputting fluid tube 24. The second float switching valve 80B has a third port 83 and a fourth port 84. The third port 83 is connected to a sixth communicating tube 86 connected to the second supplying tube 21b. The fourth port 84 is connected to the outputting fluid tube 24.

When the first switch 91 is turned on, the control device 42 outputs a control signal to the solenoids 80c of the first float switching valve 80A and the second float switching valve 80B, and thereby magnetizing the solenoid 80c. In this manner, the first float switching valve 80A and the second float switching valve 80B are switched to the float position 80a, and thereby the operation fluid in the first fluid chamber 14f and the second fluid chamber 14g of the boom cylinder 14 is outputted to the outputting fluid tube 24.

In addition, the control device 42 outputs a control signal to the solenoids 80c of the first float switching valve 80A and the second float switching valve 80B under a state where the control device 42 does not obtain the first command of the first switch 91, thereby demagnetizing the solenoids 80c. In this manner, the first float switching valve 80A and the second float switching valve 80B are switched to the block position 80b, and thereby blocking the communicating between the outputting fluid tube 24 and the first fluid chamber 14f and the second fluid chamber 14g of the boom cylinder 14.

Also in the present embodiment, in the anti-vibration operation performed by the second switch 92 turned on, the control device 42 stops the anti-vibration control performed by the turned-on second switch 92 when the first switch is turned on from the off state.

That is, under the state where the solenoid 70c of the anti-vibration switching valve 70 is magnetized in accordance with the second command (the anti-vibration switching valve 70 is in the anti-vibration position 70a), the control device 42 gives the first command priority over the second command when the first switch 91 is turned on and the first command is inputted. And, the control device 42 demagnetizes the solenoid 70c of the anti-vibration switching valve 70 even when the second switch is on, and while the solenoids 80c of the first float switching valve 80A and the second float switching valve 80B are magnetized. In this manner, the float switching valve 80A and the second float switching valve 80B are switched to the float position 80a.

According to the description mentioned above, even when the anti-vibration switching valve 70 and the float switching valve 80 are separately provided, the float operation is given priority under the commands of both of the floating operation and the anti-vibration operation, and thereby the operation by the working machine 1 is efficiently performed.

In the embodiment described above, the switching valve 50 is provided with the fluid tube for warming up the pilot fluid. However, the anti-vibration switching valve 70 or the float switching valve 80 may be provided with the fluid tube for the warming up of the pilot fluid. Meanwhile, the warm-up processing for the anti-vibration switching valve 70 or the float switching valve 80 in the control device 42 is similar to that of the switching valve 50, and thus the explanation thereof will be omitted.

Figure 4A:
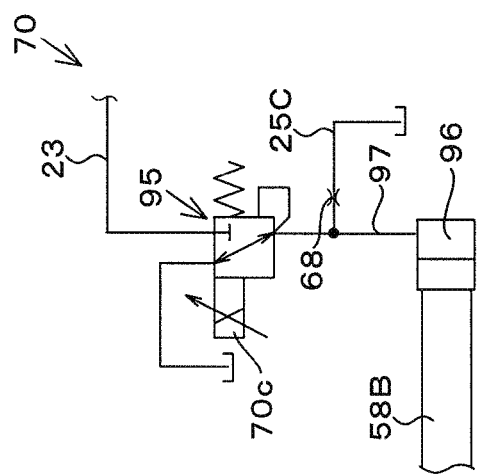
FIG. 4A is a view illustrating an anti-vibration switching valve provided with a warm-up fluid tube according to the second embodiment.

As shown in FIG. 4A, the anti-vibration switching valve 70 is constituted of a pilot type switching valve in which a solenoid valve (an electromagnetic proportional valve) is incorporated. In the anti-vibration switching valve 70, the electromagnetic valve 95 and a pressure-receiving portion 96 are connected to each other by an inner fluid tube 97, the electromagnetic valve 95 having the solenoid 70c, the pressure-receiving portion 96 being configured to receive the operation fluid are connected, and the inner fluid tube 97 is provided with the outputting fluid tube 25C. The configurations of the solenoid valve 95 and the pressure-receiving portion 96 are similar to the solenoid valve and the pressure-receiving portion provided in the switching valve 50. In this manner, by applying the pressure to the pressure-receiving portion 96 to such an extent that the anti-vibration switching valve 70 (the spool 58 B) is not switched to the anti-vibration position 70a (to be lower than the switching pressure), the operation fluid of the inner fluid tube 97 is outputted to the outputting fluid tube 25C.

In addition, as shown in FIG. 4B, each of the float switching valves 80 (the first float switching valve 80A and the second float switching valve 80B) is constituted of a pilot type switching valve in which a solenoid valve (an electromagnetic proportional valve) is incorporated. In the first float switching valve 80A and the second float switching valve 80B, the electromagnetic valve 98 having the solenoid 80c and the pressure-receiving portion 99 receiving the operation fluid are connected to each other by an inner fluid tube 100, and the inner fluid tube is provided with the outputting fluid tube 25D.

The configurations of the solenoid valve 98 and the pressure-receiving portion 99 are similar to the solenoid valve and the pressure-receiving portion disposed on the switching valve 50. In this manner, by applying the pressure to the pressure-receiving portion 99 to such an extent that the float switching valves 80 (the first float switching valve 80A and the second float switching valve 80B) are not switched to the floating position 80a (to be lower than the switching pressure), the operation fluid of the inner fluid tube 100 is outputted to the outputting fluid tube 25D, thereby warming up the pilot fluid.

Figure 4C:
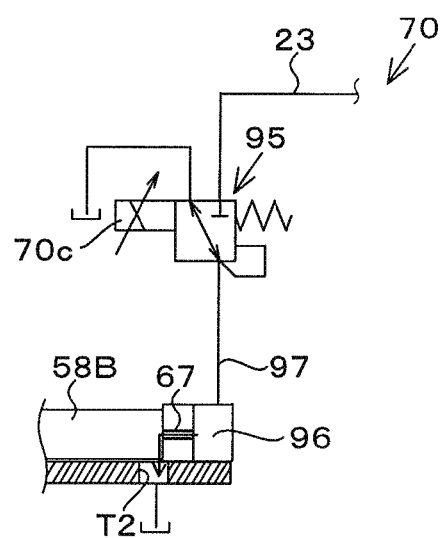
FIG. 4C is a view illustrating a modified example of the warm-up fluid tube of the float switching valve according to the second embodiment.

In addition, as shown in FIG. 4C, in the case where the spool 58 B of the anti-vibration switching valve 70 is provided with the outputting groove 67, the groove is formed by cutting off the circumference surface on the spool 58B on one side of the spool 58B in the longitudinal direction (on one side corresponding to the pressure-receiving portion 96). Under the state where, for example, the anti-vibration switching valve 70 (the spool 58 B) is in the stop position 70b, the outputting port T2 and the pressure-receiving portion 96 are connected to each other by the outputting groove 67, and thereby warming up the pilot fluid.

Figure 4D:
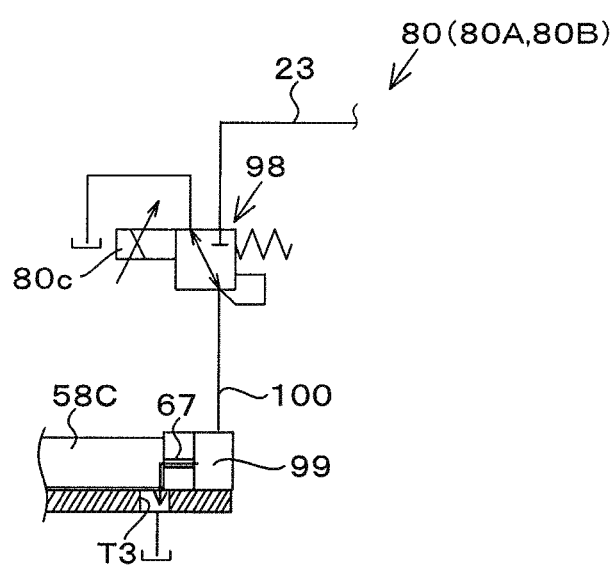
FIG. 4D is a view illustrating a modified example of the warm-up fluid tube of the float switching valve according to the second embodiment.

In addition, as shown in FIG. 4D, in the case where the outputting groove (an outputting portion) 67 is disposed on the spool 58C of the float switching valve 80 (the first float switching valve 80A and the second float switching valve 80B), the groove is formed by cutting off the circumference surface on the spool 58C on one side of the spool 58C in the longitudinal direction (on one side corresponding to the pressure-receiving portion 99). And, under the state where, for example, the float switching valve 80 (the first float switching valve 80A and the second float switching valve 80B) is in the block position 80b, the outputting port T3 and the pressure-receiving portion 99 are connected to each other by the outputting groove 67, and thereby warming up the pilot fluid.

As described above, according to the examples described above, it is possible to easily warm up the pilot fluid with use of any one of the anti-vibration switching valve 70 and the float switching valve 80.

Figure 5A:
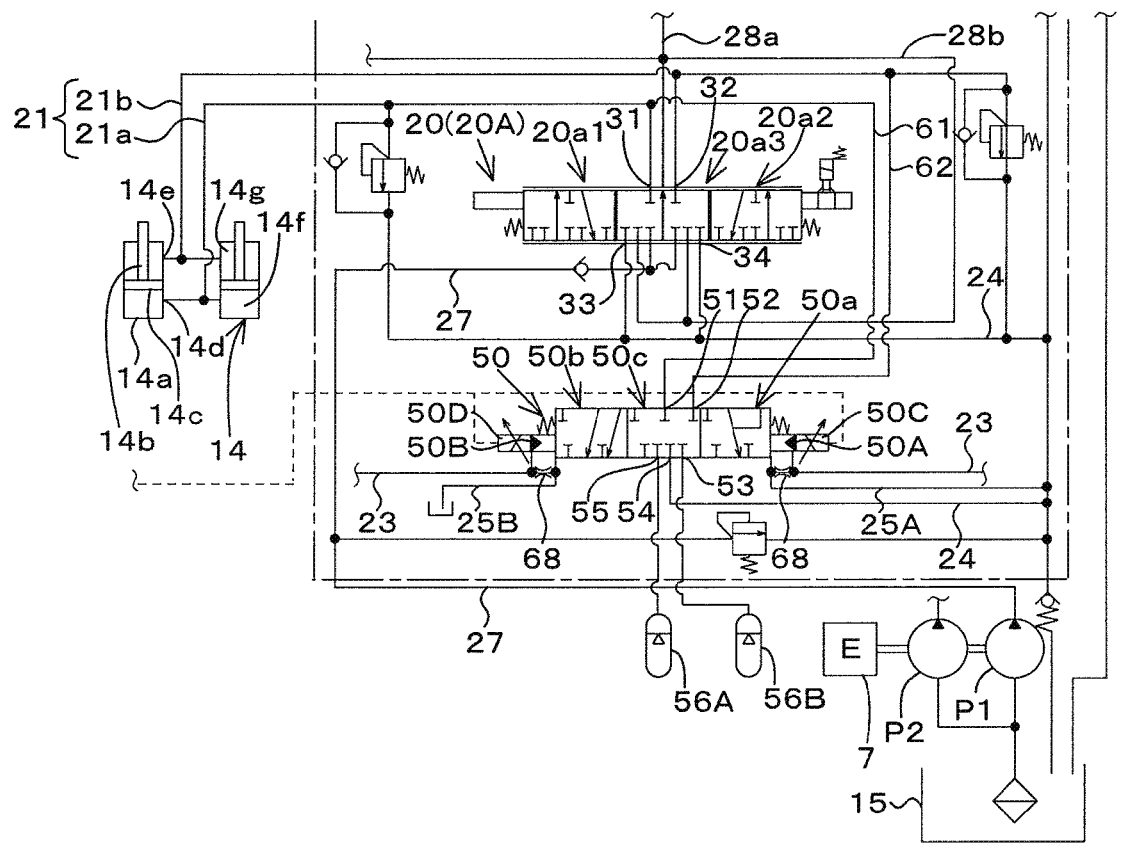
FIG. 5A is a view illustrating a modified example of the switching valve according to the second embodiment.

FIG. 5A shows a modified example of the switching valve 50.

As shown in FIG. 5A, two accumulators, that is, a first accumulator 56A and a second accumulator 56B are connected to the switching valve 50. In particular, the first accumulator 56A is connected to the fifth port 55. The second accumulator 56B is connected to the third port 53.

When the switching valve 50 is set to the first position 50a, the first port 51 and the second port 52 are connected to each other, and the first port 51 and the second port 52 are connected to the fourth port 54. In this manner, the operation fluid in the first fluid chamber 14f of the boom cylinder 14 flows through the first supplying tube 21a, the first communicating tube 61, the first port 51, and the fourth port 54 and is outputted to the outputting fluid tube 24, and the operation fluid in the second fluid chamber 14g of the boom cylinder 14 flows through the second supplying tube 21b, the second communicating tube 62, the second port 52, and the fourth port 54 and is outputted to the outputting fluid tube 24. In this manner, the floating operation is carried out.

When the switching valve 50 is set to the second position 50b, the first port 51 and the fifth port 55 are connected to each other by a spool. In this manner, the first fluid chamber 14f of the boom cylinder 14 is connected to the accumulator 56A through the first supplying tube 21a, the first communicating tube 61, the first port 51, and the fifth port 55. In addition, when the switching valve 50 is set to the second position 50b, the second port 52 and the third port 53 are connected to each other by a spool.

In this manner, the second fluid chamber 14g of the boom cylinder 14 is connected to the second accumulator 56B through the second supplying tube 21b, the second communicating tube 62, the second port 52, and the third port 53. That is, when the switching valve 50 is in the second position 50b, the first communicating tube 61 communicates with the first accumulator 56A, and the second communicating tube 62 communicates with the second accumulator 56B through the spool (the first fluid chamber 14f communicates with the first accumulator 56A, and the second fluid chamber 14g communicates with the second accumulator 56B), thereby the anti-vibration operation is carried out.

Figure 5B:
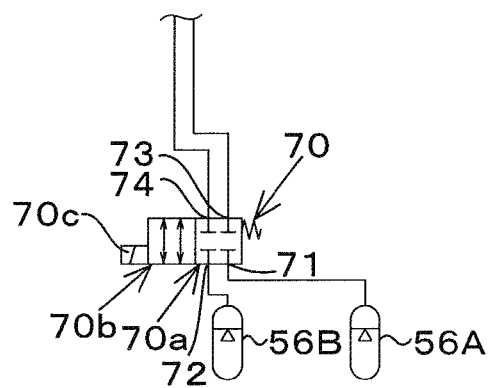
FIG. 5B is a view illustrating a modified example of the anti-vibration switching valve according to the second embodiment.

FIG. 5B shows a modified example of the anti-vibration switching valve 70. As shown in FIG. 5B, two accumulators, that is, the first accumulator 56A and the second accumulator 56B are connected to the anti-vibration switching valve 70. In particular, the first accumulator 56A is connected to the first port 71. The second accumulator 56B is connected to the second port 72.

When the anti-vibration switching valve 70 is set to the anti-vibration position 70a, the first fluid chamber 14f of the boom cylinder 14 communicates with the first accumulator 56A, and the second fluid chamber fluid chamber 14g of the boom cylinder 14 communicates with the second accumulator 56B. On the other hand, when the anti-vibration switching valve 70 is set to the stop position 70b, the communicating between the first fluid chamber 14f of the boom cylinder 14 and the first accumulator 56A is blocked, and the communicating between the second fluid chamber 14g of the boom cylinder 14 and the second accumulator 56B is blocked.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

In the embodiments described above, the operation fluid is outputted to an operation fluid tank. However, the operation fluid may be outputted to other components. That is, the fluid tube for outputting the operation fluid may be connected to a portion other than the operation fluid tank, and, for example, the fluid tube for outputting the operation fluid may be connected to the suction portion of the hydraulic pump (a portion for sucking the operation fluid) or may be connected to other portions. In addition, in the case where the plurality of control valves (switching valves) are provided with the warm-up circuits (the outputting fluid tubes 25A to 25D, the inner fluid tube, the outputting portion, and the like), it is preferred that the hydraulic pump (the pump port) is provided with the warm-up circuit in the switching valve arranged on the most downstream side.

In the embodiment described above, the switching valve 50 is constituted of an electromagnetic/pilot-type switching valve. However, the switching valve 50 may be constituted of a pilot type switching valve configured to be switched by the pilot fluid applied to the pressure-receiving portions (the first pressure-receiving portion 50A and the second pressure-receiving portion 50B), or may be constituted of a solenoid type switching valve (the electromagnetic switching valve) configured to be switched between on and off by a solenoid instead of the pressure-receiving portion.

Obviously, numerous modifications and variations of the present invention are possible in light of the above teachings. It is therefore to be understood that within the scope of the appended claims, the invention may be practiced otherwise than as specifically described herein.

What is claimed is:
1. A hydraulic system for a working machine, comprising:
   a hydraulic actuator;
   a float switching valve to perform a floating operation of the hydraulic actuator;
   an anti-vibration switching valve to perform an anti-vibration operation of the hydraulic actuator;
   a control device to stop the anti-vibration operation performed by the anti-vibration switching valve when the float switching valve performs the floating operation;

a first switch connected to the control device and configured to issue a first command of the floating operation; and a second switch connected to the control device and configured to issue a second command of the floating operation, wherein when the control device receives the second command, the control device initiates the anti-vibration operation by the anti-vibration switching valve; when the control device receives the first command while the second command is already being received, the control device stops the anti-vibration operation.

2. The hydraulic system for the working machine according to claim 1, comprising
an accumulator,
wherein the anti-vibration switching valve is configured to be switched between an anti-vibration position and a stop position,
the anti-vibration position allowing the accumulator and the hydraulic actuator to be communicated with each other and thereby allowing the anti-vibration operation,
the stop position not allowing the accumulator and the hydraulic actuator to be communicated with each other and thereby stopping the anti-vibration operation,
wherein the control device is configured to switch the anti-vibration switching valve to the stop position while the float switching valve performs the floating operation.

3. The hydraulic system for the working machine according to claim 2, comprising:
a control valve to control operation fluid that is to be supplied to the hydraulic actuator;
a first supplying tube connecting the control valve to a first fluid chamber disposed on the hydraulic actuator;
a second supplying tube connecting the control valve to a second fluid chamber disposed on the hydraulic actuator; and
an outputting fluid tube to output the operation fluid,
wherein the float switching valve is configured to be switched between a float position and a block position,
the float position allowing the first supplying tube and the second supplying tube to be communicated with the outputting fluid tube,
the block position blocking the first supplying tube and the second supplying tube from being communicated with the outputting fluid tube.

4. The hydraulic system for the working machine according to claim 1, comprising:
a control valve to control operation fluid that is to be supplied to the hydraulic actuator;
a first supplying tube connecting the control valve to a first fluid chamber disposed on the hydraulic actuator;
a second supplying tube connecting the control valve to a second fluid chamber disposed on the hydraulic actuator; and
an outputting fluid tube to output the operation fluid,
wherein the float switching valve is configured to be switched between a float position and a block position,
the float position allowing the first supplying tube and the second supplying tube to be communicated with the outputting fluid tube,
the block position blocking the first supplying tube and the second supplying tube from being communicated with the outputting fluid tube.

5. A hydraulic system for a working machine, comprising:
a hydraulic actuator;
a float switching valve to perform a floating operation of the hydraulic actuator; and
an anti-vibration switching valve to perform an anti-vibration operation of the hydraulic actuator;
wherein the float switching valve or the anti-vibration switching valve includes:
a solenoid valve to which the operation fluid serving as a pilot fluid is supplied;
a pressure-receiving portion to receive the pilot fluid from the solenoid valve;
an inner fluid tube to connect the solenoid valve to the pressure-receiving portion; and
an outputting fluid tube branched from the inner fluid tube, the outputting fluid tube being configured to drain the pilot fluid from the pressure-receiving portion.

6. The hydraulic system for the working machine according to claim 5, comprising:
a first switch to issue a first command of the floating operation;
a second switch to issue a second command of the anti-vibration operation; and
a control device,
wherein the control device is configured to:
switch the float switching valve to a first position or to a second position in accordance with the first command;
switch the anti-vibration switching valve to the first position or to the second position in accordance with the second command; and
not to switch, in warming up of operation fluid, the float switching valve and the anti-vibration switching valve in accordance with the first command and the second command.

7. The hydraulic system for the working machine according to claim 6,
wherein the float switching valve or the anti-vibration switching valve includes a three-position switching valve,
the three-position switching valve including a spool,
and wherein the pressure-receiving portion includes:
a first pressure-receiving portion arranged on one side of the spool in a longitudinal direction of the spool; and
a second pressure-receiving portion arranged on the other side of the spool in the longitudinal direction,
and wherein the pilot fluid is applied to the first pressure-receiving portion and the second pressure-receiving portion.

8. The hydraulic system for the working machine according to claim 5,
wherein the float switching valve or the anti-vibration switching valve includes a three-position switching valve,
the three-position switching valve including a spool,
and wherein the pressure-receiving portion includes:
a first pressure-receiving portion arranged on one side of the spool in a longitudinal direction of the spool; and
a second pressure-receiving portion arranged on the other side of the spool in the longitudinal direction,
and wherein the pilot fluid is applied to the first pressure-receiving portion and the second pressure-receiving portion.

9. A hydraulic system for a working machine, comprising:
a hydraulic actuator;
a float switching valve to perform a floating operation of the hydraulic actuator; and
an anti-vibration switching valve to perform an anti-vibration operation of the hydraulic actuator,
wherein the float switching valve or the anti-vibration switching valve includes:
   a solenoid valve to which pilot fluid is supplied;
   a pressure-receiving portion to receive of the pilot fluid from the solenoid valve;
   a spool; and
   an outputting port,
wherein the spool includes an outputting portion, and
the outputting portion connects the pressure-receiving portion to the outputting port, and drains the pilot fluid in the pressure-receiving portion through the outputting port.

10. The hydraulic system for the working machine according to claim 9, comprising:
a first switch to issue a first command of the floating operation;
a second switch to issue a second command of the anti-vibration operation; and
a control device,
wherein the control device is configured to:
   switch the float switching valve to a first position or to a second position in accordance with the first command;
   switch the anti-vibration switching valve to the first position or to the second position in accordance with the second command; and
   not to switch, in warming up of operation fluid, the float switching valve and the anti-vibration switching valve in accordance with the first command and the second command.

11. The hydraulic system for the working machine according to claim 10,
wherein the float switching valve or the anti-vibration switching valve includes a three-position switching valve,
the three-position switching valve including the spool,
and wherein the pressure-receiving portion includes:
   a first pressure-receiving portion arranged on one side of the spool in a longitudinal direction of the spool; and
   a second pressure-receiving portion arranged on the other side of the spool in the longitudinal direction,
and wherein the pilot fluid is applied to the first pressure-receiving portion and the second pressure-receiving portion.

12. The hydraulic system for the working machine according to claim 9,
wherein the float switching valve or the anti-vibration switching valve includes a three-position switching valve,
the three-position switching valve including the spool,
and wherein the pressure-receiving portion includes:
   a first pressure-receiving portion arranged on one side of the spool in a longitudinal direction of the spool; and
   a second pressure-receiving portion arranged on the other side of the spool in the longitudinal direction,
and wherein the pilot fluid is applied to the first pressure-receiving portion and the second pressure-receiving portion.

* * * * *

UNITED STATES PATENT AND TRADEMARK OFFICE
CERTIFICATE OF CORRECTION

| | |
|---|---|
| PATENT NO. | : 11,306,746 B2 |
| APPLICATION NO. | : 16/987910 |
| DATED | : April 19, 2022 |
| INVENTOR(S) | : Yuji Fukuda et al. |

It is certified that error appears in the above-identified patent and that said Letters Patent is hereby corrected as shown below:

In the Claims

Column 19, Line 5 (Claim 1), please change "a second command of the floating operation" to -- a second command of the anti-vibration operation --.

Signed and Sealed this
Twenty-seventh Day of June, 2023

Katherine Kelly Vidal
*Director of the United States Patent and Trademark Office*